United States Patent
Depperschmidt et al.

(10) Patent No.: US 12,429,226 B1
(45) Date of Patent: Sep. 30, 2025

(54) MIXING ELEMENTS FOR ROTATING DETONATION COMBUSTION SYSTEMS

(71) Applicant: General Electric Company, Cincinnati, OH (US)

(72) Inventors: Daniel Louis Depperschmidt, Saratoga Springs, NY (US); Kapil Kumar Singh, Rexford, NY (US); Hannah Erin Bower, Rexford, NY (US); Arin Elspeth Lastufka Cross, Waterford, NY (US); Sarah Marie Monahan, Latham, NY (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/763,619

(22) Filed: Jul. 3, 2024

(51) Int. Cl.
*F23R 7/00* (2006.01)
*F02C 5/00* (2006.01)

(52) U.S. Cl.
CPC . *F23R 7/00* (2013.01); *F02C 5/00* (2013.01)

(58) Field of Classification Search
CPC .................................... F23R 7/00; F02C 5/00
See application file for complete search history.

(56) References Cited

U.S. PATENT DOCUMENTS

| | | | |
|---|---|---|---|
| 3,754,511 A | 8/1973 | Damon |
| 5,937,635 A | 8/1999 | Winfree |
| 7,841,167 B2 | 11/2010 | Rasheed |
| 8,087,250 B2 | 1/2012 | Gutmark |
| 8,881,500 B2 | 11/2014 | Gutmark |
| 9,140,456 B2 | 9/2015 | Kenyon |
| 10,436,110 B2 * | 10/2019 | Holley | F02C 5/12 |

(Continued)

FOREIGN PATENT DOCUMENTS

| | | |
|---|---|---|
| FR | 3127024 | 3/2023 |
| FR | 3127025 | 3/2023 |

(Continued)

OTHER PUBLICATIONS

Rankin, Brent A, Fotia, Matthew L, Paxson, Daniel E, Hoke, John L and Schauer, Frederick R, Experimental and numerical evaluation of pressure gain combustion in a rotating detonation engine, 53rd AIAA, Aerospace Sciences Meeting, 2015-0877, 2015; https://doi.org/10.2514/6.2015-0877 Jan. 3, 2015; 17 pgs.

*Primary Examiner* — William H Rodriguez
(74) *Attorney, Agent, or Firm* — Carter, DeLuca & Farrell LLP

(57) ABSTRACT

A rotating detonation combustion system includes a detonation channel including an inner wall and an outer wall and extend in a longitudinal direction from an inlet of the detonation channel to an outlet of the detonation channel. A first mixing element and a second mixing element are disposed in the rotating detonation combustion system. The first mixing element forming a ring on the inner wall and the second mixing element forming a ring on the outer wall of the detonation channel adjacent the inlet. Each of the first mixing element and the second mixing element comprise a plurality of protrusions disposed circumferentially along the inner wall and the outer wall and extend into the detonation channel such that the plurality of protrusions affects vectors of at least a portion of the fuel and at least a portion of the fluid passing through recesses between the plurality of protrusions.

20 Claims, 10 Drawing Sheets

(56) References Cited

U.S. PATENT DOCUMENTS

| | | |
|---|---|---|
| 10,767,866 B2 | 9/2020 | Rickey et al. |
| 11,371,711 B2 | 6/2022 | Singh |
| 11,473,780 B2 | 10/2022 | Pal |
| 2006/0260291 A1 | 11/2006 | Vandervort |
| 2009/0193786 A1* | 8/2009 | Murrow .................... F02C 3/14 60/39.38 |
| 2018/0180289 A1 | 6/2018 | Lavertu, Jr. |
| 2020/0248905 A1* | 8/2020 | Singh ........................ F23R 7/00 |
| 2020/0248906 A1* | 8/2020 | Singh ........................ F23R 3/28 |
| 2021/0108801 A1* | 4/2021 | Singh ....................... F23R 3/002 |

FOREIGN PATENT DOCUMENTS

| | | |
|---|---|---|
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

MIXING ELEMENTS FOR ROTATING DETONATION COMBUSTION SYSTEMS

GOVERNMENT INTERESTS

This invention was made with government support under contract number FA8650-19-D-2507 awarded by the Department of Defense/Air Force Research Lab. The government has certain rights in the invention.

TECHNICAL FIELD

These teachings relate generally to jet engines and more particularly to rotating detonation combustion systems including mixing elements, such as turbulators.

BACKGROUND

Rotating detonation engines are a type of engine that uses a form pressure gain combustion where one or more detonations continuously travel around an annular channel. A rotating detonation engine typically includes an annulus with an inlet end through which a fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus and is exhausted with the exhaust flow.

The detonation wave provides a high-pressure region in a combustion region of the combustion system. Rotating detonation pressure gain combustion systems are expected to operate at much higher frequencies than other pressure gain combustion concepts such as pulse detonation combustors.

Maintaining a rotating detonation wave within rotating detonation combustors present technical challenges, and in particular during low power conditions of the engines, as well as selectively controlling and/or adjusting the operating conditions. For example, when a rotating detonation engine is operating at an idle condition (e.g., not generating enough propulsive force to propel the engine or a vehicle that includes the engine), the detonations rotating within the combustor of the engine may dissipate or be extinguished.

BRIEF DESCRIPTION OF DRAWINGS

Various needs are at least partially met through provision of the mixing elements for rotating detonation combustions systems described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
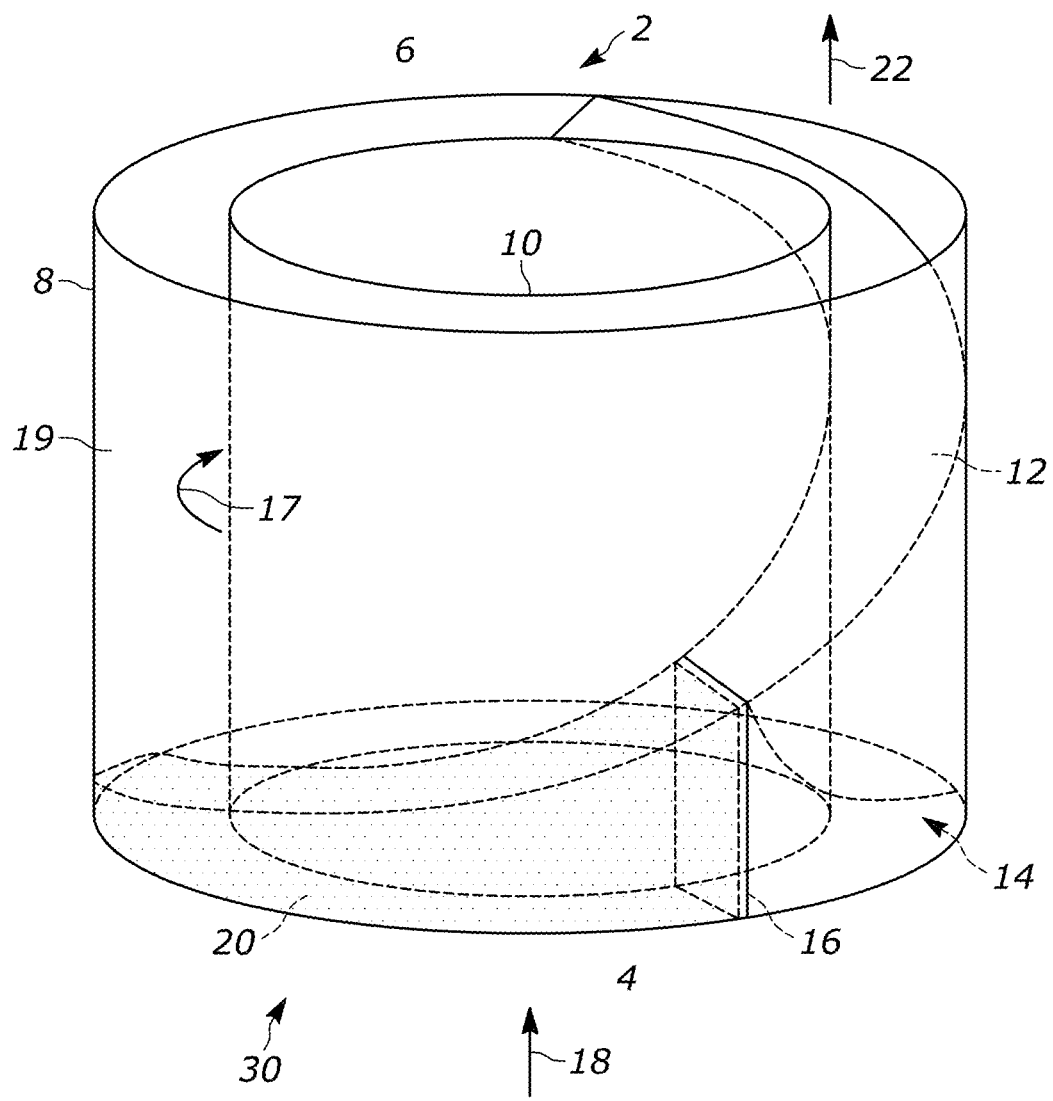
FIG. 1 comprises a perspective schematic view of a rotating detonation combustion system.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Reference now will be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

As used herein, the terms "first," "second," "third," etc. may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Flight capable rotating detonation combustion systems are currently under development. Rotating detonation combustion systems that include at least some of the reactants radially injected can result in pressure losses due to the construction of the system that introduces the reactants into the detonation channel. The pressure losses at or near the injection location may result in additional losses in the system as a whole. Sub-sonic pressure perturbations in previous deflagration systems can push and move the reactants from the ideal injection location. Systems including high pressure losses and sub-sonic pressure perturbations are typically incapable of maintaining a continuous wave around the annulus, and consequently, incapable of maintaining the resulting thrust. These are all significant challenges in the context of aviation application settings.

In further rotating combustion systems, deflagration waves are utilized. In these systems, the deflagration wave includes an associated shockwave leading in front of the deflagration wave as it travels around the annulus. The shockwave impacts the reactants being injected in front of the deflagration wave and can negatively affect the system as a whole.

Disclosed herein are examples of mixing elements disposed within a detonation channel of a rotating detonation combustion system. The rotating detonation combustion systems disclosed herein include a detonation channel having an inner wall and an outer wall and extending in a longitudinal direction from an inlet to an outlet of the detonation channel. The inlet provides a conduit through which fluid flows into the detonation channel. A fluid plenum and fuel plenum are fluidly connected to the inlet for injecting fluid (e.g., air) and fuel into the detonation channel. The one of more mixing elements, also referred to as or including turbulators, are disposed on the inner and/or outer wall and are disposed downstream of the fluid and fuel plenums. The one or more mixing elements form a ring around the wall the mixing element(s) is disposed on, adjacent the inlet. The one or more mixing elements include a plurality of protrusions disposed circumferentially along the inner and/or outer wall, and the protrusions extends radially inward into the detonation channel. The protrusions are configured to affect a vector of at least a portion of the fluid and fuel passing through recesses between the plurality of protrusions. The one or more mixing elements provide turbulence to the reactants as they flow into the detonation channel and allow for the one or more detonation waves to continue around the detonation channel. In varying the shape and corresponding recesses of the protrusions, the mixing of the reactants can be optimized for various engines and various desired thrusts and propulsions. This may be accomplished, at least in part, by utilizing the flow of air through the detonation channel to move the reactants into the detonation channel without losses in pressure.

In some configurations, the system includes one or two mixing elements. The mixing elements may be disposed at varying locations on the inner wall and/or outer wall relative to one another. While reference herein may be a made to one mixing element disposed on the inner or outer wall, or conversely, two mixing elements disposed on the inner and outer wall, without being limited to a single configuration, the present disclosure contemplates both configurations and the description of one configuration equally applies to the second configuration where applicable. Similarly, in some configurations, the protrusions of the mixing elements may have varying shapes, sizes, and locations. Additionally, the recesses disposed between the protrusions may vary in shape, size, and spacing. While certain protrusions and recesses may be described with reference to one another, a particular shape, or a mixing elements configuration, the present disclosure contemplates the interchangeability of protrusions of one configuration and recesses of another configuration.

In one exemplary embodiment, the protrusions have an upstream and/or a downstream side that is sloped or angled, including a rectangular longitudinal cross-section, a triangular longitudinal cross-section, or a trapezoidal longitudinal cross-section. In another exemplary configuration, at least two of the protrusions are disposed contiguous to one another, i.e., including minimal to no recess therebetween. In yet further exemplary embodiments, the protrusions include a uniform space, or recess, disposed between the plurality of protrusions. In further embodiments, the protrusions include a non-uniform space, or recess, disposed between the plurality of protrusions.

In some configurations, the protrusions include a substantially uniform radial length extending into the detonation channel. In other configurations, the protrusions include a non-uniform radial length extending into the detonation channel. In configurations utilizing two mixing elements, the protrusions of one of the mixing elements may be substantially uniform with the protrusions of the other mixing elements. Conversely, in further configurations utilizing two mixing elements, the protrusions of one of the mixing elements may be non-uniform compared to the protrusions of the other mixing elements. Further, the mixing elements of one of the mixing elements may be angled relative to the protrusions of the other mixing elements.

In embodiments utilizing two mixing elements, the mixing elements may be aligned with one another, include the inner wall mixing elements, and corresponding protrusions, upstream from the outer wall mixing elements, and corresponding protrusions, or include the inner wall mixing elements, and corresponding protrusions, downstream from the outer wall mixing elements, and corresponding protrusions. The mixing elements may be generally circular, however, in some embodiments, the mixing elements may form a waved ring including protrusions of the same or various lengths and shaped. In embodiments utilizing two mixing elements, the waved mixing elements may be aligned with one another. Alternatively, in some embodiments, the waved mixing elements may be misaligned and/or out of phase with one another. Further, in embodiments utilizing angled protrusions, the protrusions are angled relative to a plane running substantially parallel to a longitudinal centerline, as will be illustrated below. The variations and modifications to the mixing element, protrusions, recesses, and other elements just described all aid in achieving the above outlined benefits. In some embodiments, protrusion shapes described herein may be selected to increase mixing based on the speed of the fluids, distances between the inner and outer walls, sizes and locations of the air and flue plenum, and/or other geometries that, together, affect fluid flow and fluid mixing rate.

FIG. 1 illustrates a schematic diagram of one example of a rotating detonation combustor system 30. The combustor 2 includes an annular combustor formed from an outer wall 8 and an inner wall 10. The combustor 2 is defined by the walls 8 and 10 has an inlet 4 (in which reactants 18, a combination of fuel and air for example, enters) and an outlet end 6 from which an exhaust flow 22 exits the combustor 2. A detonation wave 16 travels in a circumferential direction 17 of the annulus (and around an annular axis of the annulus), thereby consuming the incoming reactants 18 and providing a high-pressure region 14 in an expansion region 12 of the combustor 2. The burned reactants (e.g., combustion gases) 19 exit the annulus and are exhausted as the exhaust flow 22. The expansion region 20 behind the detonation wave 16 has very high pressures and this pressure can feed back into an upstream chamber from which the air and fuel are introduced and form unburnt reactants 18. Increasing the mixing of the reactants 18 as they enter the inlet 4 may enhance the operability and overall performance of the combustor 2 to sustain the detonation wave 16 in use.

Figure 17:
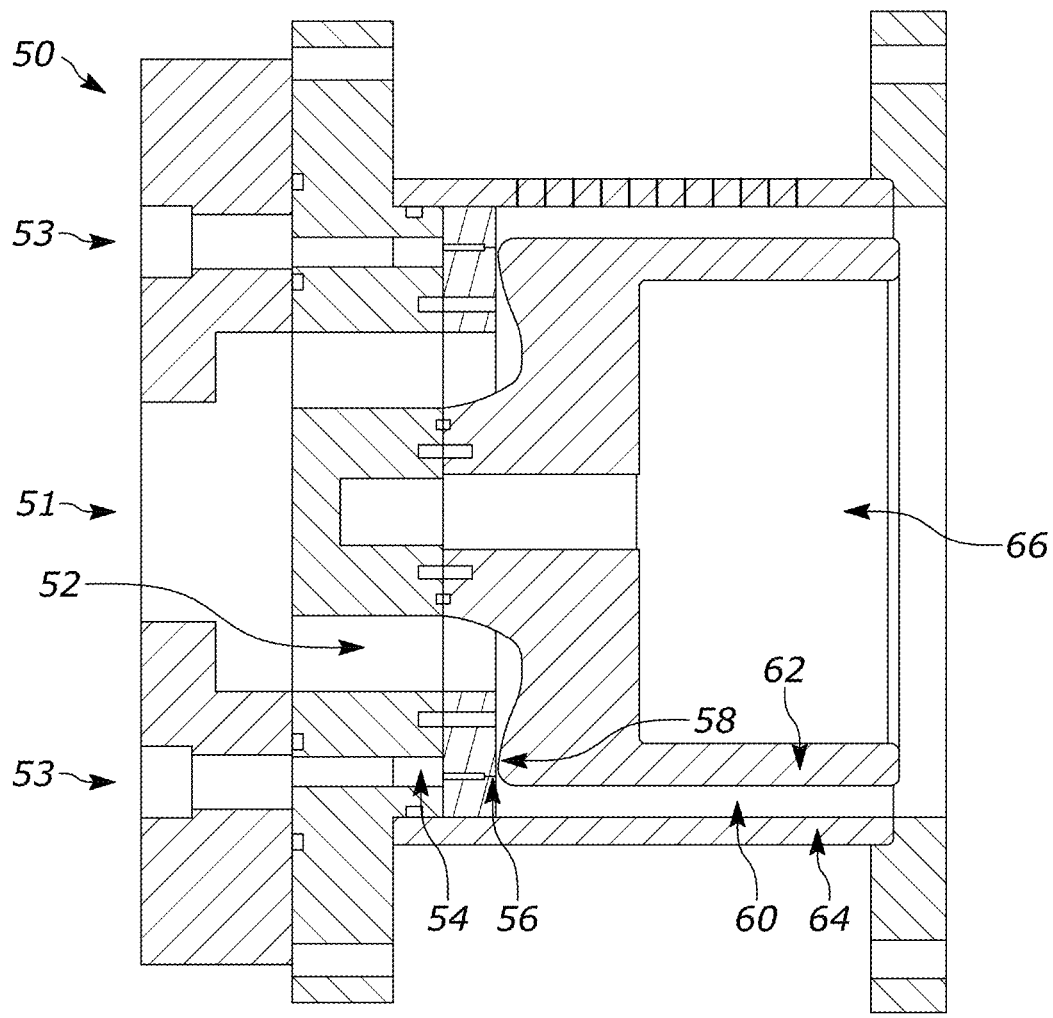
FIG. 17 comprises a prior art system of an example rotating detonation combustion system.

Referring now to FIG. 17 which illustrates a known prior art system of an example rotating detonation combustion system 50. The prior art rotating detonation combustion system 50 includes a flow of air 51 and fuel 53. The air 51 enters an air plenum 52. The air plenum 52 is substantially in the middle of the prior art rotating detonation combustion system 50. The fuel 53 enters a fuel plenum 54. The prior art rotating detonation combustion system 50 includes one or more fuel plenums 54 which are disposed circumferentially around the air plenum 52. The fuel 53 is injected into an inlet of a detonation channel 60 through a fuel injection hole 56. The air 51 is injected into the inlet of the detonation channel 60 through an air injection slot 58. The air injection slot 58 is substantially perpendicular to the flow of air. The flow of air extends axially down the prior art rotating detonation combustion system 50. The air injection slot 58 extends radially outward. Additionally, the air injection slot 58 is funnel-shaped, tapering towards a small opening which forms the air injection slot 58. The air 51 and fuel 53 are injected into the detonation channel 60 which includes an inner wall 62 and an outer wall 64. The detonation channel 60 and the outer wall 64 are substantially parallel to one another. The inner wall 62 is a wall surrounding a center body 66.

The air injection slot 58 extends radially outward and tapers towards the outer wall 64. The air 51 is compressed through a small opening adjacent the fuel injection hole 56. As the fuel 53 is injected through the fuel injection hole 56, the air 51 is injected into the air plenum 52 through the small opening with an increased speed. The increased speed is utilized to aid in mixing the air 51 and fuel 53. As a result, the prior art rotating detonation combustion system 50 creates pressure losses due to the tapered shape of the air injection slot 58. That is, the mechanism for mixing the air 51 and fuel 53 to create and sustain a deflagration wave as it progresses around the center body 66 also causes pressure losses. The resulting pressure losses and sub-sonic deflagration wave result in a system incapable of maintaining the desired thrust, which limits the operability range of the system. As such, a system including an optimization of proper mixing or reactants, i.e., air and fuel, while minimizing losses associated therewith to sustain a continuous detonation wave as it travels around the detonation channel is desirable.

Figure 2:
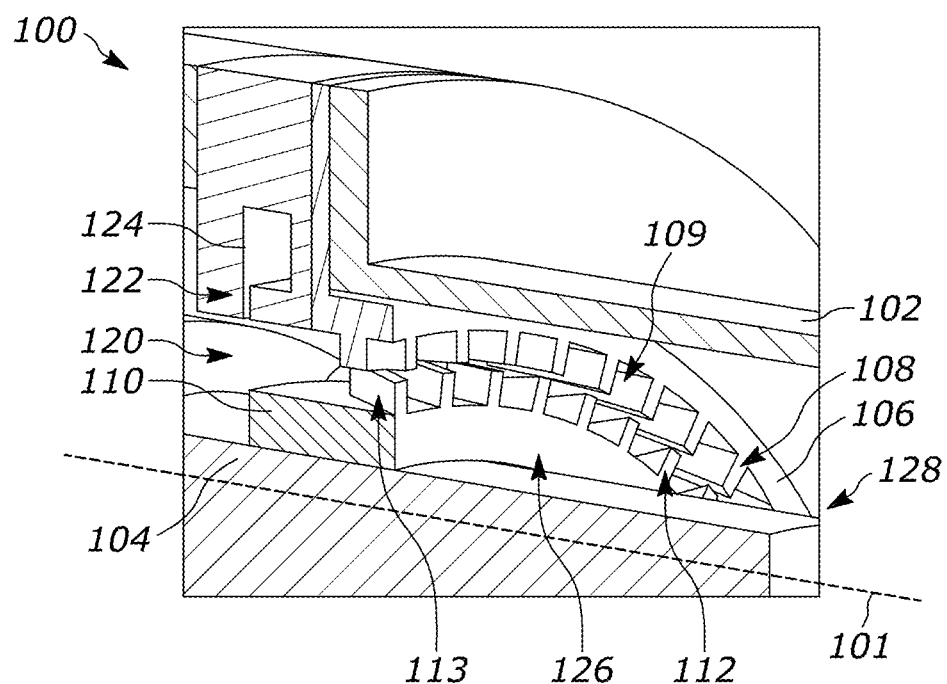
FIG. 2 comprises a perspective view of a mixing element in accordance with various embodiments of these teachings.

Referring now to FIG. 2, an exemplary mixing element configuration according to some embodiments is illustrated. A portion of a rotating detonation combustion system 100 is shown. The portion of the rotating detonation combustion system 100 shown is disposed at or near the inlet 4 of FIG. 1. The rotating detonation combustion system 100 includes an inlet 120, similar to the inlet 4 of FIG. 1. Adjacent the inlet is a fuel plenum 124 and a fuel injector 122. The fuel injector 122 may be in the inlet 120 or just upstream of the inlet 120. The fuel plenum 124 is filled with fuel, which is then injected via the fuel injector 122. The rotating detonation combustion system 100 further includes a combustion region 126, or more generally, a detonation channel, defined by an inner wall 104 and an outer wall 102. The inner wall 104 and the outer wall 102 may be downstream of the inlet 120 and the fuel injector 122. The inner wall 104 and the outer wall 102 extend from the inlet 120 of the rotating detonation combustion system 100 to an outlet 128.

The inlet 120 forms an inlet for reactants, such as air and fuel and the mixture thereof, to enter into the combustion region 126, also referred to as a detonation channel. As air enters into the inlet 120, creating a fluid plenum upstream of the fuel injector 122, the fuel is injected via the fuel injector 122 from the fuel plenum 124. The fuel may be injected into the inlet 120, just upstream of the inlet 120, or just downstream of the inlet 120. To achieve a detonation wave within the combustion region 126, the reactants are mixed as they enter the combustion region 126. This is achieved through the use of one or more mixing elements. Because the air enters the combustion region 126 substantially in line with the flow of air into the inlet 120, the section of the inlet 120 upstream of the fuel injector 122 acts as a fluid plenum for the air as the air flow moves towards the inlet 120.

The rotating detonation combustion system 100 includes an inner mixing element 110 disposed on and/or coupled to at least a portion of the inner wall 104 and an outer mixing element 106 disposed on and/or coupled to at least a portion of the outer wall 102. In some configurations, the inner mixing element 110 and the outer mixing element 106 are integral with the inner wall 104 and outer wall 102 respectively. The mixing elements 110 and 106 are disposed adjacent and between both the inlet 120 and the combustion region 126. The one or more mixing elements 110 and 106 are additionally disposed just downstream of the fuel injector 122. By disposing the mixing elements 110 and 106 within or just downstream of the inlet 120 while also just downstream of the fuel injector 122, the mixing elements 110 and 106 are able to create turbulence within the reactants and aid in mixing the reactants.

More specifically, the mixing elements 110 and 106 are configured to affect vectors associated with the reactants as the reactants pass through the mixing elements 110 and 106. Accordingly, the one or more mixing elements 110 and 106 include protrusions and associated recesses and/or gaps therebetween by which the reactants flow through. The protrusions and recesses, more generally referred to as a mixing element geometry, are configured to impart turbulence into the reactants and mix the reactants as they progress downstream into the combustion region 126. The mixing elements 110 and 106 form a ring on the inner wall 104 and/or the outer wall 102 extending radially around the inlet 120 with the protrusions extending into the inlet 120 and combustion region 126 as they extend circumferentially around the mixing element.

Figure 3:
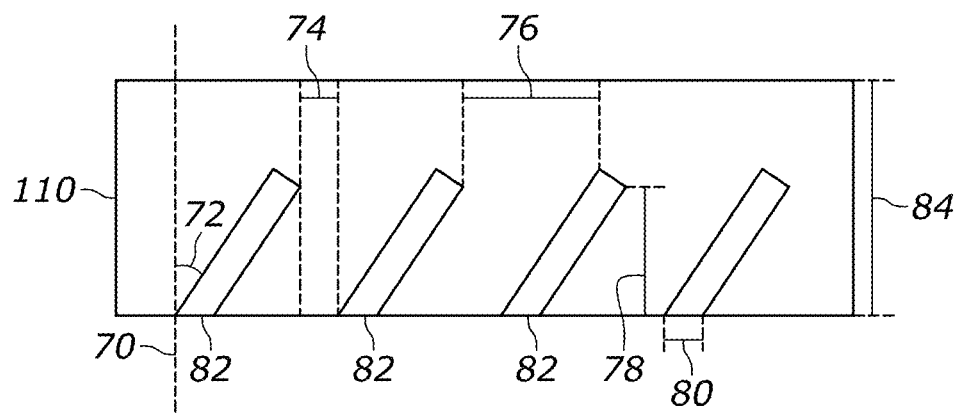
FIG. 3 comprises a top schematic view of a portion of a mixing element of FIG. 2 in accordance with various embodiments of these teachings.

The inner mixing element 110 includes a mixing element geometry 112 having a side surface 109. Similarly, the outer mixing element 106 includes a mixing element geometry 108 having a side surface 113. As explained above, while particular details of mixing element geometries, or shape of the side surfaces thereof, may be described relating to an inner or outer mixing element, or system using one or two mixing elements, the present disclosure contemplates the interchangeability of these components to the other mixing element and/or the other of the single or dual mixing element system. The inner mixing element 110 is coupled to the inner surface 104, Referring to FIG. 3, a portion of the inner mixing element 110 is shown. The inner mixing element 110 is shown including a plurality of protrusions 82 (three of which are labeled in FIG. 3). FIG. 3 includes a plane 70, illustrated as a dashed line, which is parallel to a longitudinal centerline 101 (FIG. 1). The protrusions 82 include a thickness 80, which is sized to provide a blockage to the inlet 120 (FIG. 2) of 10-80% circumferentially around the longitudinal centerline 101. In some configurations, the thickness 80 may range from 0.30 mm to 55 mm. Additionally, the plurality of protrusions 82 include a length 78 of about 0.30 mm to 75 mm. The length 78 may range from 30% to 80% of the total length 84 of the inner mixing element 110. Further, as shown in FIG. 2, the side surface 113 includes a depth of approximately 5-90% of the inlet 120 in the radial direction. In some configurations, this may range from 0.30 mm to 55 mm extending into the combustion region 126. The plurality of protrusions 82 include spacings therebetween, both a total spacing 74 and a tip to tip spacing 76. The spacings therebetween include a total spacing 74 of approximately 1-30 degrees and can range from 0.05 to 127 mm apart, corresponding to the recess between the protrusions, and a tip to tip spacing 76 of approximately 0.35 to 510 mm. Additionally, the plurality of protrusions 82 include an angle 72 of about 0-80 degrees relative to the plane 70.

In the embodiment shown in FIG. 2, the mixing element geometry 108 of the outer mixing element 106 includes angled protrusions, having a rectangular side surface 109, extending into the combustion region 126. Similar to the protrusions 82 discussed above with reference to FIG. 2, the protrusions of the outer mixing element 106 include dimensions associated therewith, measured similarly as illustrated in FIG. 3. The protrusions of the outer mixing element 106 include a thickness 80 of about which is sized to provide a blockage to the inlet 120 of 10-80% circumferentially around the longitudinal centerline 101. In some configurations, the thickness 80 may range from 0.30 mm to 55 mm. Additionally, the plurality of protrusions of the outer mixing element 106 include a length of about 0.30 to 75 mm. The length may range from 30% to 80% of the total length of the outer mixing element 106. Further, as shown in FIG. 2, the side surface 109 includes a depth of approximately 5-90% of the inlet 120 in the radial direction. In some configurations, this may range from 0.30 mm to 55 mm extending into the combustion region 126. The plurality of protrusions of the outer mixing element 106 include spacings therebetween, both a total spacing and a tip to tip spacing. The spacings therebetween include a total spacing of approximately 1-30 degrees and can range from 0.05 to 127 mm apart, corresponding to the recess between the protrusions of the outer mixing element 106, and a tip to tip spacing of approximately 0.35-510 mm. Additionally, the plurality of protrusions of the outer mixing element 106 include an angle of about 0-80 degrees relative to the plane 70.

Figure 8:
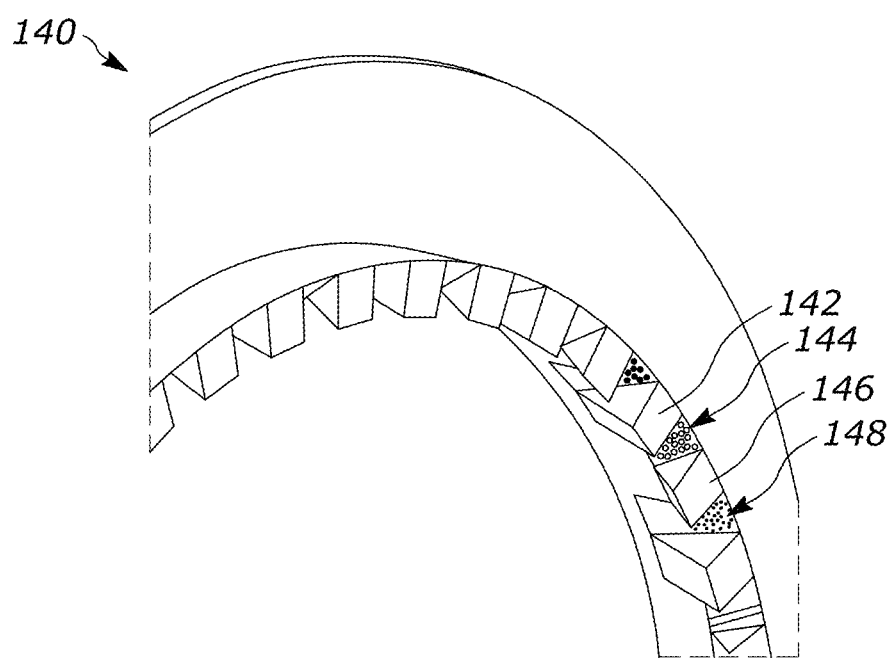
FIG. 8 comprises a rear perspective view of a mixing element in accordance with various embodiments of these teachings.

The mixing element geometry 112 and mixing element geometry 108 include recesses formed or defined as the spaces between the protrusions. In some embodiments, the recesses, as shown in FIG. 8, while disposed between the protrusions, may be textured including bumps, dimples, non-liner flow-paths, both in uniform and non-uniform patterns, to additionally affect the vectors associated with the reactants as they progress through the mixing elements 110, 106. In further embodiments, the recesses, while disposed between the protrusions, may be smooth.

Referring back to FIG. 2, the angled protrusions of the inner wall 104 and the angled protrusions of the outer wall 102 extend in different directions relative to one another and relative to the plane 70 shown in FIG. 3. That is to say, the angle 72 of the protrusions 82 of the inner mixing element 110 is in one direction relative to the plane 70 and the angle of the plurality of protrusion of the outer mixing element 106 is in the opposite direction relative to the plane 70. The angled protrusions may be at angle ranging from 30-150 degrees. In some embodiments, the angled protrusions may be at an angle of approximately 90 degrees relative to one another. For example, the angled protrusions of the outer wall 102 may be angled at 45 degrees in one direction relative to the plane 70 and the angled protrusions of the inner wall 104 may be angled at 45 degrees in the opposite direction relative to the plane 70 such that they are angled at approximately 90 degrees relative to one another. In some embodiments, the angled protrusions may extend in similar directions, and in some instances, the angled protrusions are parallel to one another. In yet further embodiments, the protrusions may be parallel to the longitudinal centerline 101.

Figure 4:
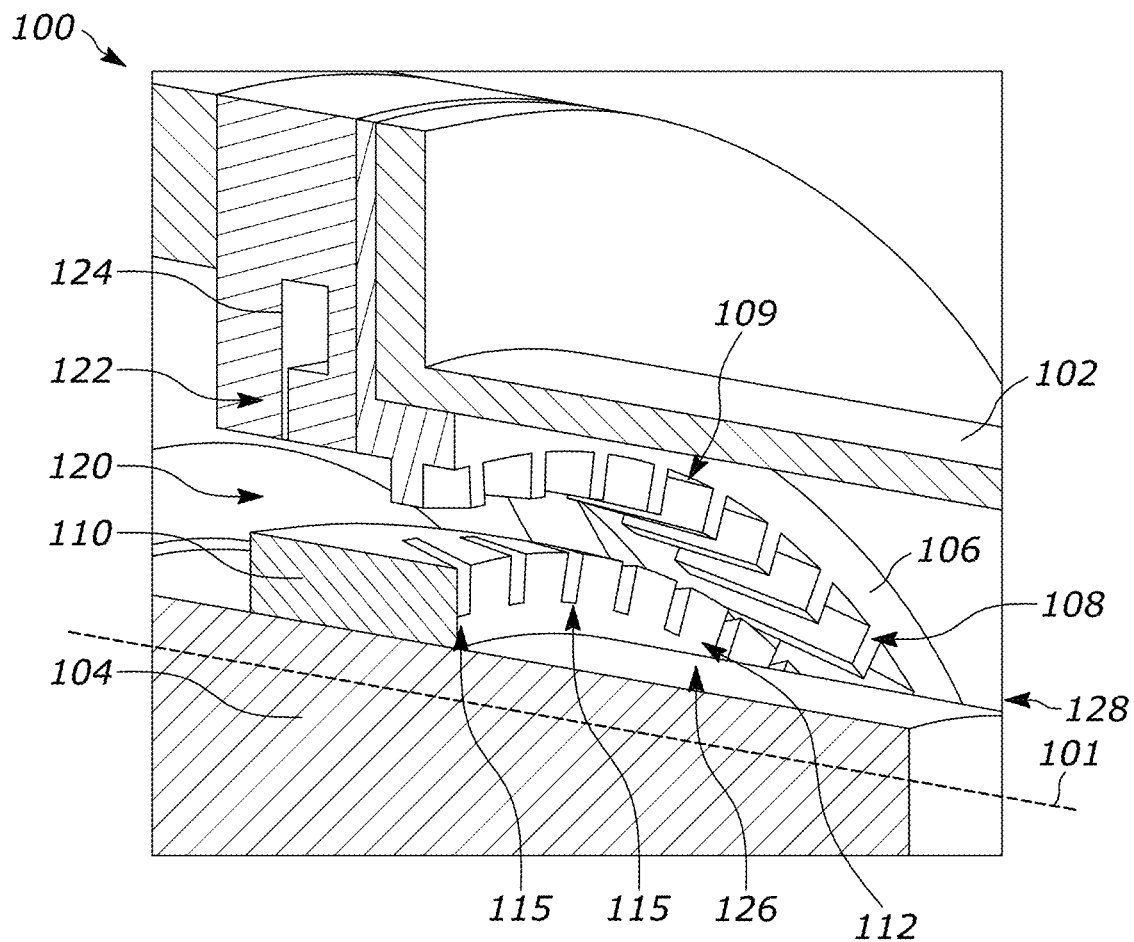
FIG. 4 comprises a perspective view of a mixing element in accordance with various embodiments of these teachings.

Referring to FIG. 4, another embodiment of rotating detonation combustion system 100 is shown. Parts sharing the same reference numbers in FIGS. 3 and 4 are the same or similar, and descriptions are not repeated herein. In FIG. 4, the mixing element geometry 108 of the outer mixing element 106 includes angled protrusions, having a rectangular side surface 109, extending into the combustion region 126. The angled protrusions of the outer wall 102 are similar to those described above with reference to FIG. 3. The mixing element geometry 112 of the inner mixing element 110 includes grooves 115 disposed into the inner mixing element 110. The grooves 115 may be angled similar to the angled protrusions described above with reference to the mixing element geometry 112 of FIG. 3, however, the grooves 115 may extend only partially into the mixing element 110. For example, the grooves 115 may extend 20-80% of the radial depth of the mixing element 110. Similar to as described above with reference to FIG. 3, the angled protrusions of the mixing element geometry 108 and the grooves 115 of the mixing element geometry 112 may be angled either opposed to one another, in the same direction, or parallel to one another.

Figure 5:
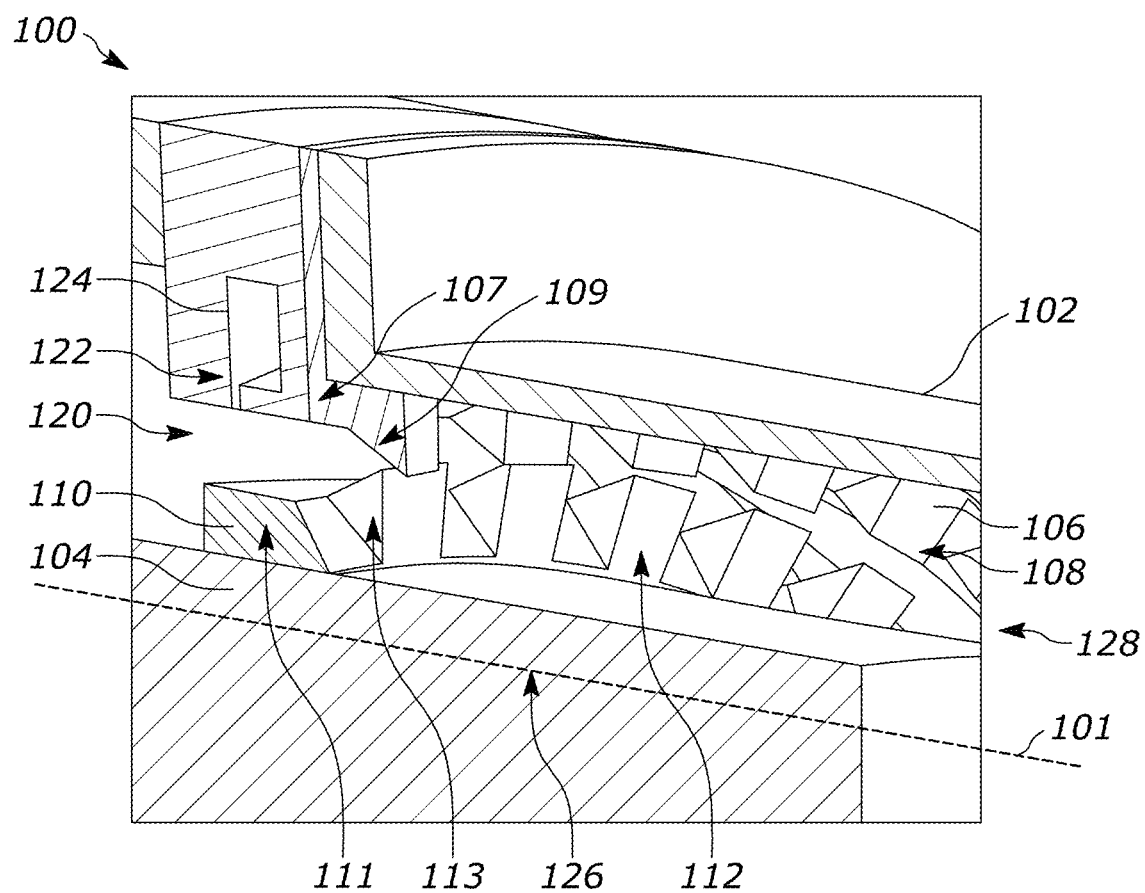
FIG. 5 comprises a perspective view of a mixing element in accordance with various embodiments of these teachings.

Referring to FIG. 5, another embodiment of rotating detonation combustion system 100 is shown. Parts sharing the same reference numbers in FIGS. 3 and 5 are the same or similar, and descriptions are not repeated herein. In FIG.

5, the mixing element geometry 108 of the outer mixing element 106 is a pointed protrusion, having a triangular side surface 109. The mixing element geometry 108 includes a flat portion 107 just upstream of the side surface 109 of the protrusion 106. The protrusion 106 extends inward into the combustion region 126 and extends substantially parallel to the longitudinal centerline 101. Conversely, the protrusion 106 of the mixing element geometry 108 may be angled relative to the longitudinal centerline 101. The protrusions 106 include a slope which includes the side surface 109, or the downstream portion, extending further into the combustion region 126 than the flat portion 107. In some embodiments, the side surface 109 is substantially perpendicular to the circumference of the mixing element.

The mixing element geometry 112 of the inner mixing element 110 includes a substantially flat raised portion 111 adjacent the inlet 120 side of the combustion region 126 and protrusions 110 disposed downstream therefrom. In this way, the flat raised portion 111 of the inner mixing element 110 may be a raised ring disposed circumferentially around the inner wall 104. The mixing element geometry 112 also includes a pointed side surface 113 extending outward from the inner wall 104 and into the combustion region 126. The protrusions 110 include a slope which includes the side surface 113 extending further into the combustion region 126 than the flat raised portion 111. In some embodiments, the raised portion 111 may be about 50% of the axial length of the inner mixing element 110. In further embodiments, the raised portion may range from 25% to 75% of the axial length of the inner mixing element 110 defined by the length of the mixing element along the inner wall 104. In this configuration, a portion of the pointed protrusions 110 are disposed below an upper surface of the substantially flat raised portion 111 of the inner mixing element 110. In some embodiments, the downstream side of the raised flat portion 111 is sloped/angled between each of the protrusions 110.

The protrusions of the mixing element geometry 112 may be angled relative to the plane 70 and the protrusions of the mixing element geometry 108. Additionally, the protrusions of the outer mixing element 106 and the inner mixing element 110 may be in-line with one another, or in some embodiments, offset from one another. In this way, the turbulence provided by the protrusions and recesses may be varied by aligning, overlapping, and/or offsetting the protrusions. In this configuration, the pointed protrusion extends beyond the substantially flat raised portion 111 of the inner mixing element 110.

Figure 6:
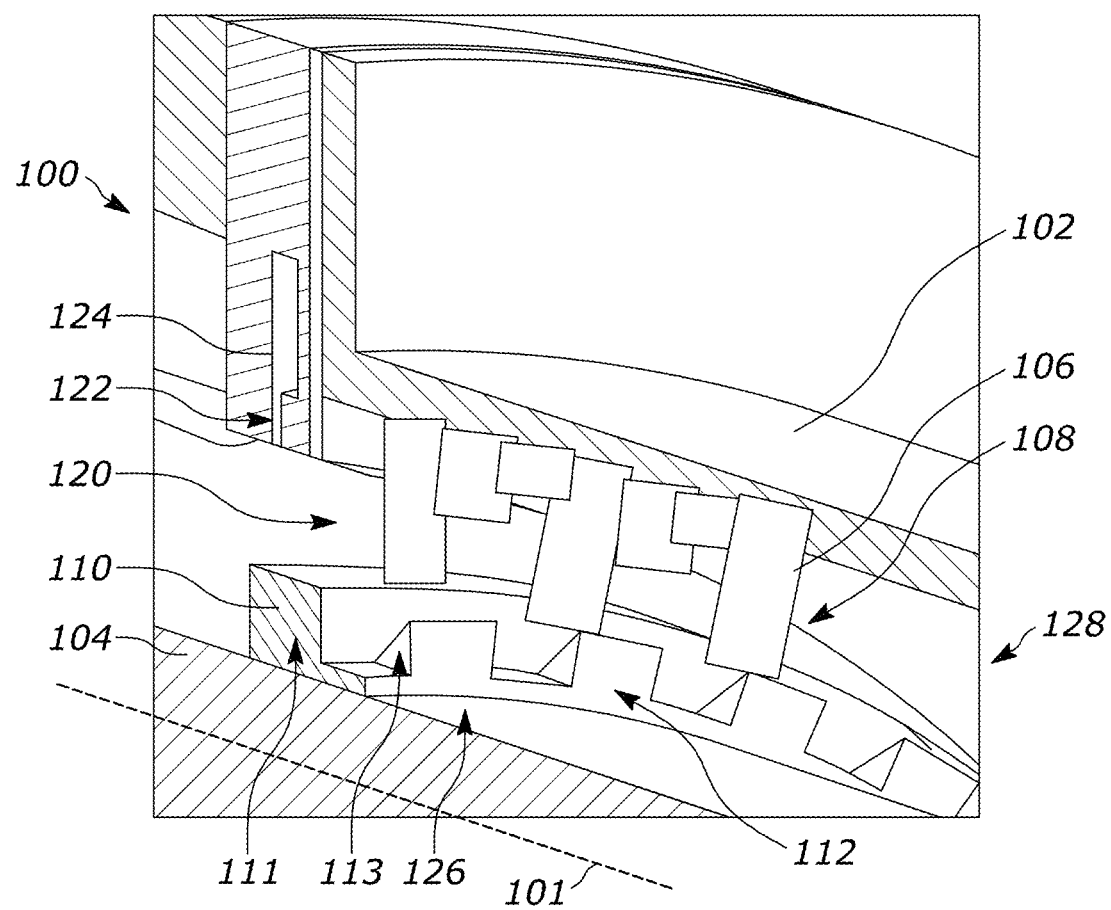
FIG. 6 comprises a perspective view of a mixing element in accordance with various embodiments of these teachings.

Referring to FIG. 6, another embodiment of rotating detonation combustion system 100 is shown. Parts sharing the same reference numbers in FIGS. 3 and 6 are the same or similar, and descriptions are not repeated herein. In FIG. 6, the mixing element geometry 108 of the outer mixing element 106 includes stepped protrusions. In this way, consecutive protrusions of the mixing element geometry 108 vary in height extending into the combustion region 126. This stepped configuration may, as shown in FIG. 6, be a consistent pattern of height changes after a particular number of protrusions; in this instance, every fourth protrusion is substantially the same height. In other embodiments, the height may vary without a consistent pattern.

The mixing element geometry 112 of the inner mixing element 110 includes a flat raised portion 111 adjacent the inlet 120 side of the combustion region 126 and protrusions 110 having a side surface 113 disposed downstream therefrom. In this way, the upstream portion of the inner mixing element 110 may be a raised ring disposed circumferentially around the inner wall 104. The protrusions 110 disposed downstream from the raised portion 111 may include a pointed triangular side surface 113, similar to those described above with reference to FIG. 5. In some embodiments, the raised portion 111 may be about 50% of the axial length of the inner mixing element 110. In further embodiments, the raised portion may range from 25% to 75% of the axial length of the inner mixing element 110 defined by the length of the mixing element along the inner wall 104. In this configuration, the pointed protrusions are disposed behind the substantially flat raised portion of the inner mixing element 110, along the longitudinal direction.

Figure 7:
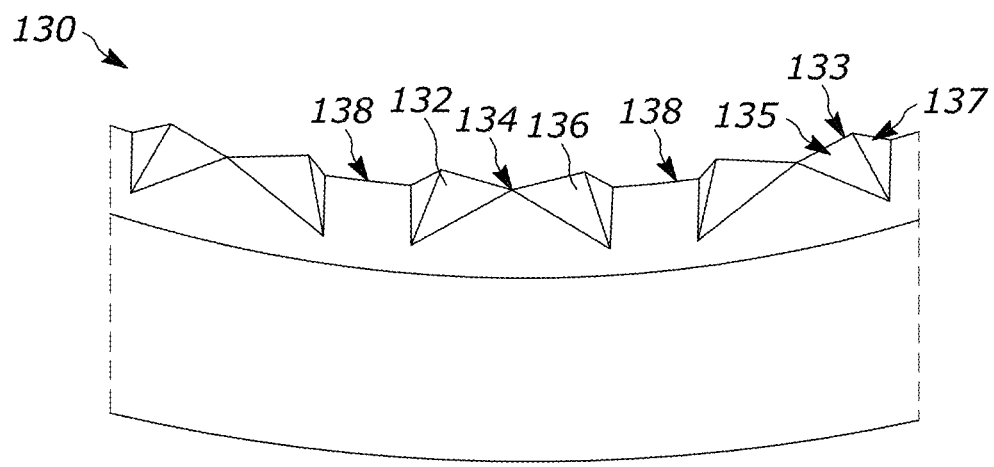
FIG. 7 comprises a perspective view of a mixing element in accordance with various embodiments of these teachings.

Referring to FIG. 7, another embodiment of rotating detonation combustion system 100 is shown. Parts sharing the same reference numbers in FIGS. 3 and 7 are the same or similar, and descriptions are not repeated herein. These configurations may be utilized on either the inner mixing element 110 or the outer mixing element 106. In FIG. 7, the mixing element 130 includes a plurality of pairs of protrusions 132 and 136. The protrusions 132 and 136 are contiguous with one another with little to no space between a connecting point 134. In this way, the protrusions 132 and 136 substantially abut one another and are spaced in pairs with a first pair including little to no gap at the connecting point 134 and a recess 138 disposed on each side of the protrusions 132 and 136. The recess 138 may be defined by the outer edge of each protrusion which extends substantially parallel to one another. The protrusions 132 and 136 may be generally pyramidal with a triangular base and includes three triangular surfaces. A first triangular surface 133 upstream from the second triangular surface 135 and the third triangular surface 137. Additionally, the protrusions 132 and 136 may form an angle of approximately 90 degrees between the third triangular surface 137 of the protrusion 132 and the second triangular surface 135 of the protrusion 136. In some embodiments, the first triangular surface 133 may be flat such that the surface near the inlet 120 side of the combustion region 126 is substantially perpendicular to the flow of reactants as they pass over and through the mixing elements.

Referring to FIG. 8, a rear view of an exemplary mixing element 140 according to some embodiments is shown. These configurations may be utilized on either the inner mixing element 110 or the outer mixing element 106. The exemplary mixing element 140 includes a first exemplary protrusion 142, a first recess 144, a second exemplary protrusion 146, and a second recess 148. While two protrusions and two recesses are described with regard to FIG. 8, the exemplary mixing element 140 includes the continuation of this sequence and/or pattern of protrusions and recess around the entirety of the exemplary mixing element 140. The first exemplary protrusion 142 and the second exemplary protrusion 146 include angled or pointed protrusions, similar to those described above with reference to FIG. 5. The first protrusion 142 may include an axial length that is larger than the axial length of the second protrusion 146. As shown in FIG. 8, the first exemplary protrusion 142 extends further upstream than the second exemplary protrusion 146.

The first recess 144 and the second recess 148 may include differences in sizes, i.e., the radial spacing between the first exemplary protrusion 142 and the second exemplary protrusion 146 may vary. Additionally, the depth of the recess into the exemplary mixing element 140 may vary. For example, as shown in FIG. 8, the second recess 148 includes a depth into the exemplary mixing element 140 while the first recess 144 is substantially flat along the exemplary mixing element 140. This may vary with the first recess 144 including a depth while the second recess 148 is smooth, both can be smooth, or both may include a depth that is the same as one another or different.

Referring to FIGS. 9-12, various mixing element designs, illustrated as front views, looking downstream, thereof, are shown. These configurations may be utilized on either the inner mixing element 110 or the outer mixing element 106. Additionally, in instances where two mixing elements are used, these configurations may include a substantially similar mixing element designs disposed on the other mixing element, or, in further instances, include a substantially different mixing element design.

Figure 9:
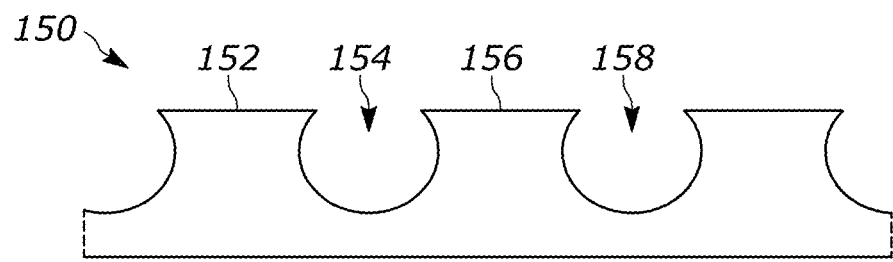
FIG. 9 comprises a front view of a mixing element in accordance with various embodiments of these teachings.

Referring to FIG. 9, an exemplary mixing element 150 is shown. The exemplary mixing element 150 includes protrusions 152 and 156 as well as recesses 154 and 158. The recesses 154 and 158 are shaped as circular arcs. The protrusions 152 and 156 include the corresponding shapes to the circular arc shaped recesses 154 and 158. The size of the arcs can be optimized to achieve sufficient mixing of reactants.

Figure 10:
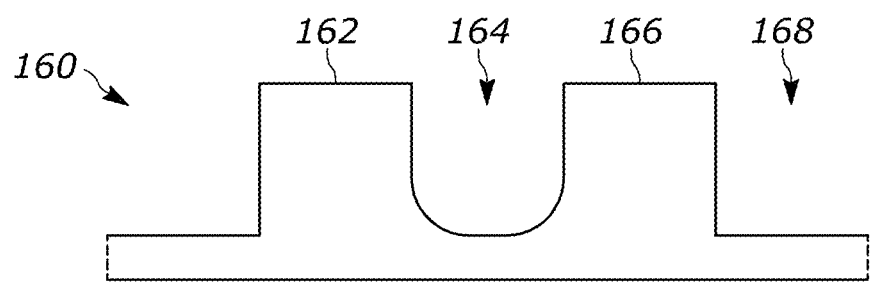
FIG. 10 comprises a front view of a mixing element in accordance with various embodiments of these teachings.

Referring to FIG. 10, an exemplary mixing element 160 is shown. The exemplary mixing element 160 includes protrusions 162 and 166 as well as recesses 164 and 168. The protrusions 162 and 166 include a substantially rectangular cross-section. The recesses 164 and 168 may include the corresponding rectangular shape of the protrusion, as shown by the recess 168, or they may include an oblong shape, being generally rectangular with rounded corners, as shown by the recess 164.

Figure 11:
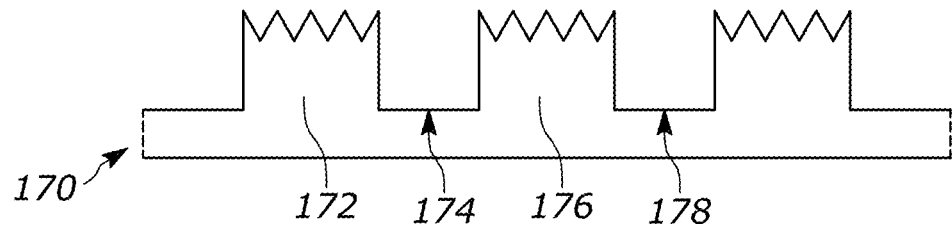
FIG. 11 comprises a front view of a mixing element in accordance with various embodiments of these teachings.

Referring to FIG. 11, an exemplary mixing element 170 is shown. The exemplary mixing element 170 includes protrusions 172 and 176 as well as recesses 174 and 178. The protrusions 172 and 176 include a substantially rectangular cross-section with serrations disposed on the tops of the protrusions thereof. The recesses 174 and 178 may include corresponding rectangular shapes, as shown by the recesses 174 and 178.

Figure 12:
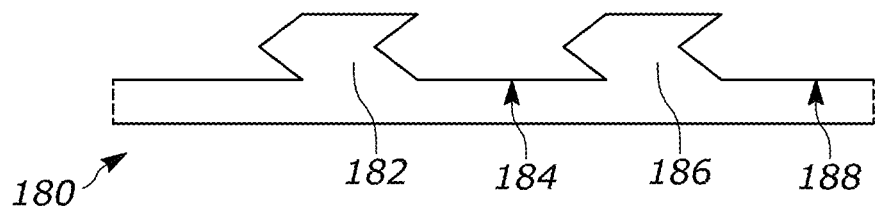
FIG. 12 comprises a front view of a mixing element in accordance with various embodiments of these teachings.

Referring to FIG. 12, an exemplary mixing element 180 is shown. The exemplary mixing element 180 includes protrusions 182 and 186 as well as recesses 184 and 188. The protrusions 182 and 186 include a folded rhombus or trapezoid, including a shape similar to an arrow. The recesses 184 and 188 may include corresponding shapes to the protrusions, as shown by the recesses 184 and 188.

Figure 13:
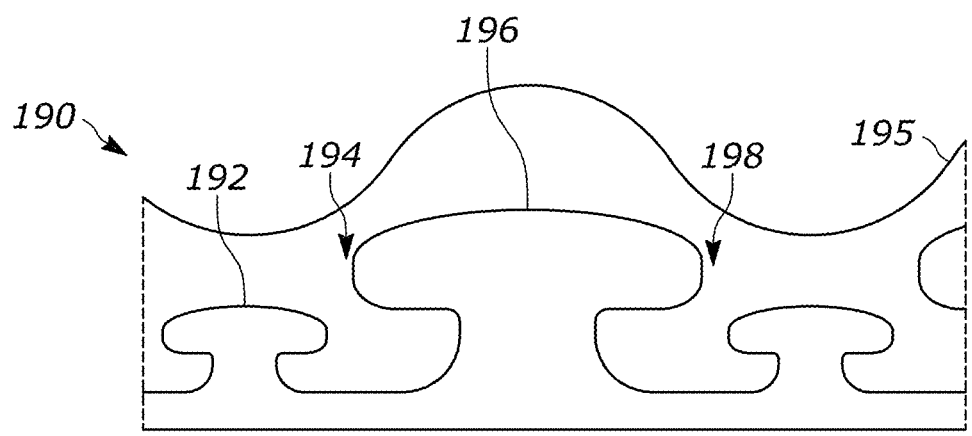
FIG. 13 comprises a front view of a mixing element in accordance with various embodiments of these teachings.
Figure 14:
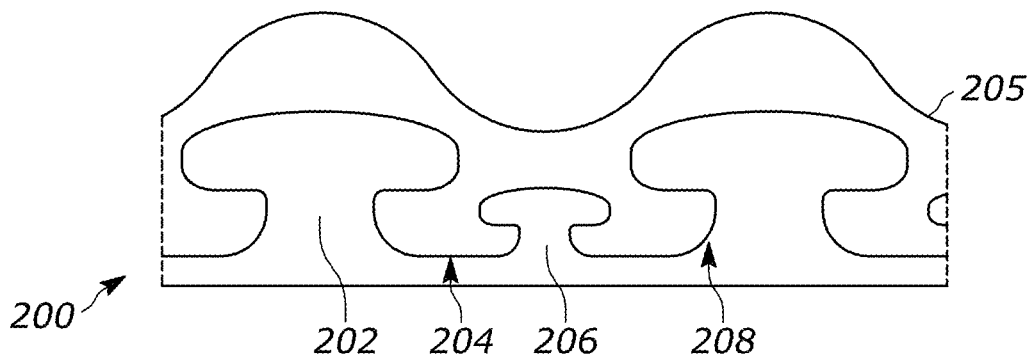
FIG. 14 comprises a front view of a mixing element in accordance with various embodiments of these teachings.

Referring to FIGS. 13 and 14, mixing element designs, illustrated as cross-sections thereof, are shown. These configurations may be utilized on either the inner mixing element or the outer mixing element and are shown including wave-shaped mixing elements opposing the exemplary mixing elements including protrusions. Referring to FIG. 13, an exemplary mixing element 190 is shown. The exemplary mixing element 190 includes protrusions 192 and 196 as well as recesses 194 and 198. The protrusions 192 and 196 may be mushroom-shape (e.g., having a rounded tip portion that is wider than the root) varying in size, as can be seen by protrusions 192 and 196. The recesses 194 and 198 may include corresponding shapes to the protrusions, as shown by the recesses 194 and 198. A second mixing element 195, disposed across from the exemplary mixing element 190, may include a wave-shaped pattern which mirrors the sizes of the protrusions.

Referring to FIG. 14, an exemplary mixing element 200 is shown. The exemplary mixing element 200 includes protrusions 202 and 206 as well as recesses 204 and 208. The protrusions 202 and 206, similar to the exemplary mixing element 190, may be mushroom-shaped varying in size, as can be seen by protrusions 202 and 206. The recesses 204 and 208 may include corresponding shapes to the protrusions, as shown by the recesses 204 and 208. A second mixing element 205, disposed across from the exemplary mixing element 200, may include a wave-shaped pattern, such as a sinusoidal shape, which mirrors the sizes of the protrusions.

Figure 15:
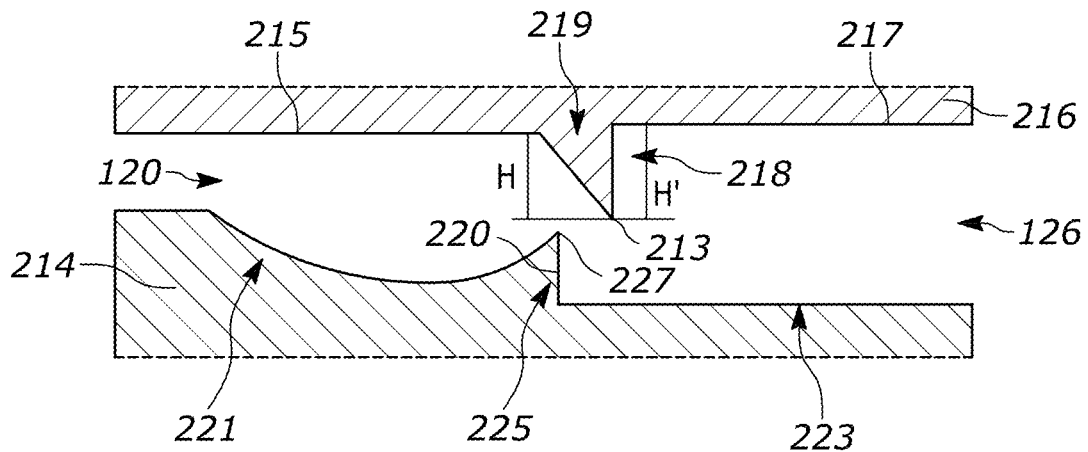
FIG. 15 comprises a cross-sectional view of a mixing element in accordance with various embodiments of these teachings.
Figure 16:
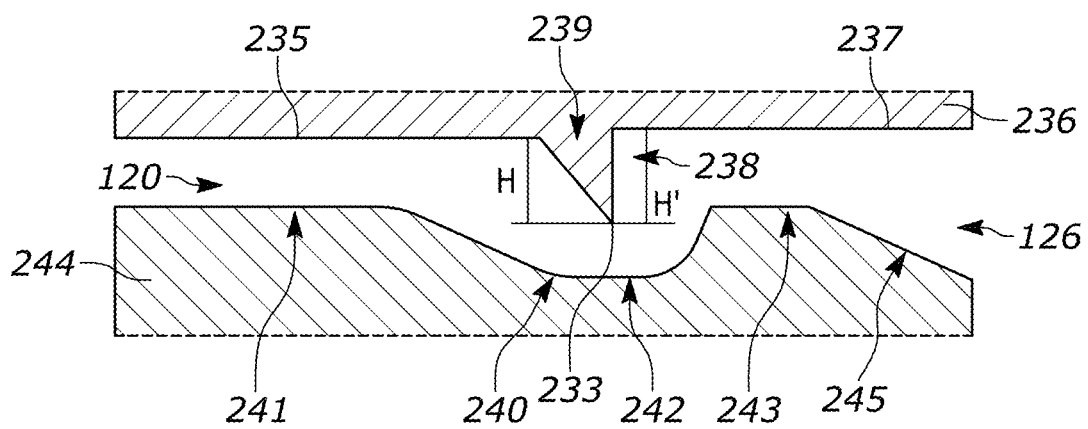
FIG. 16 comprises a cross-sectional view of a mixing element in accordance with various embodiments of these teachings.

Referring to FIGS. 15 and 16, mixing element designs according to some embodiments, illustrated as cross-sections along the longitudinal centerline 101, are shown. These configurations may be utilized on either the inner mixing element or the outer mixing element and are shown including one mixing element opposing the other mixing element and including one upstream of the other mixing element. These configurations may be utilized on either the inner mixing element or the outer mixing element. Additionally, these configurations may include the opposing mixing element upstream of the other illustrated in the figure. By providing walls which contour towards one another, the directionality of the reactant flow towards the opposing wall promote the further interaction with the turbulator or mixing elements. Additionally, the inner and outer walls described herein provide a detonation surface due to the hard pressure boundary they provides.

Referring to FIG. 15, exemplary mixing elements 218 and 220 are shown. The exemplary mixing element 218 is disposed on an outer wall 216 of a rotating combustion system which includes an inlet 120 and combustion region 126. The mixing element 218 includes a protrusion 219, or in some instances a ring, having a triangular cross-section, as shown by the protrusion 219. The exemplary mixing element 218 also includes a substantially flat portion 215 upstream of the protrusion 219 and a substantially flat portion 217 downstream of the protrusion 219. The downstream portion 217 is below the substantially flat portion 215 such that a downstream radial length H' of the protrusion 219, i.e., the length of the protrusion in the radial direction defined as perpendicular to the direction of the inlet, of the downstream portion is larger than an upstream radial length H of the substantially flat portion 215.

The exemplary mixing element 220 is disposed on an inner wall 214 of a rotating combustion system which includes an inlet 120 and combustion region 126. The mixing element 220 includes a protrusion 225, or in some instances a ring, having a triangular cross-section, as shown by the protrusion 225. The exemplary mixing element 220 also includes a curved portion 221 upstream of the protrusion 225 and a substantially flat portion 223 downstream of the protrusion 225. Curvature of the curved portion 221 upstream of the protrusion 225 may vary depending on the desired gap created between the protrusion 225 of the exemplary mixing element 218 and the protrusion 219 of the exemplary mixing element 220. At least a tip 227 of the protrusion 225 of the exemplary mixing element 220 is upstream from a tip 213 of the protrusion 219 of the exemplary mixing element 218.

Referring to FIG. 16, exemplary mixing elements 238 and 240 according to some embodiments are shown. The exemplary mixing element 238 is disposed on an outer wall 236 of a rotating combustion system which includes an inlet 120 and combustion region 126. The mixing element 238 includes a protrusion 239, or in some instances a ring, having a triangular cross-section, as shown by the protrusion 239. The exemplary mixing element 238 also includes a substantially flat portion 235 upstream of the protrusion 239 and a substantially flat portion 237 downstream of the protrusion 239. The downstream portion 237 is below the upstream portion 235 such that a downstream radial length H' of the protrusion 239, i.e., the length of the protrusion in the radial direction defined as perpendicular to the direction of the inlet, of the downstream portion is larger than an upstream radial length H of the upstream portion 235.

The exemplary mixing element 240 is disposed on an inner wall 244 of a rotating combustion system which includes an inlet 120 and combustion region 126. The exemplary mixing element 240 also includes a substantially flat upstream portion 241, a curved portion 242, a second flat portion 243, and an angled portion 245. The curvature of the curved portion 242 may vary depending on the desired gap created between the protrusion 239 of the exemplary mixing element 238 and the curved portion 242 of the exemplary mixing element 240. The curved portion 242 of the exemplary mixing element 240 is adjacent to the protrusion 239 of the exemplary mixing element 228 such that at least a tip 233 of the protrusion 239 extends into the curved portion 242. The second flat portion 243 of the exemplary mixing element 240 is downstream of the curved portion 242 and includes an angled portion 245 downstream therefrom.

Utilizing the various teachings provided herein, sufficient mixing of reactants may be achieved without the pressure losses created by radially injected the reactants. In this way, pressure losses that hinder current rotating detonation systems can be avoided. Additionally, the proper reactant mixing aids in maintaining the detonation wave as it progresses around the annulus to create sufficient and sustained thrust. As noted above, the various embodiments disclosed herein affect vectors associated with the reactants as they pass into and through the inlet just before entering the combustion region. In doing so, the reactants are mixed in such a way that the detonation wave is maintained and sufficient thrust is sustained.

Further aspects of the disclosure are provided by the subject matter of the following clauses:

A rotating detonation combustion system comprising a detonation channel including an inner wall and an outer wall and extending in a longitudinal direction from an inlet of the detonation channel to an outlet of the detonation channel, the inlet provides a conduit through which fluid flows into the detonation channel; a fluid plenum fluidly connected to the inlet of the detonation channel for injecting fluid into the detonation channel; a fuel plenum fluidly connected to the inlet of the detonation channel for injecting fuel into the detonation channel; and a first mixing element and a second mixing element downstream of the fluid plenum and the fuel plenum, the first mixing element forming a ring on the inner wall and the second mixing element forming a ring on the outer wall of the detonation channel adjacent the inlet, wherein each of the first mixing element and the second mixing element comprise a plurality of protrusions disposed circumferentially along the inner wall and the outer wall and extend into the detonation channel such that the plurality of protrusions affects vectors of at least a portion of the fuel and at least a portion of the fluid passing through recesses between the plurality of protrusions.

The rotating detonation combustion system of the preceding clause wherein at least one of the plurality of protrusions has an upstream side and/or a downstream that is sloped.

The rotating detonation combustion system of one or more of the preceding clauses wherein at least one of the plurality of protrusions has an upstream side and/or a downstream side including a rectangular longitudinal cross-section.

The rotating detonation combustion system of one or more of the preceding clauses wherein at least one of the plurality of protrusions has an upstream side and/or a downstream side including a triangular longitudinal cross-section.

The rotating detonation combustion system of one or more of the preceding clauses wherein at least one of the plurality of protrusions has an upstream side and/or a downstream side including a trapezoidal longitudinal cross-section.

The rotating detonation combustion system of one or more of the preceding clauses wherein at least two of the plurality of protrusions are disposed contiguous one another.

The rotating detonation combustion system of one or more of the preceding clauses wherein the plurality of protrusions are disposed with a uniform spacing between the plurality of protrusions.

The rotating detonation combustion system of one or more of the preceding clauses wherein the plurality of protrusions are disposed with variable spacing between the plurality of protrusions.

The rotating detonation combustion system of one or more of the preceding clauses wherein the plurality of protrusions of the first mixing element and the second mixing element have uniform radial lengths extending into the detonation channel.

The rotating detonation combustion system of one or more of the preceding clauses wherein the plurality of protrusions of the first mixing element and the second mixing element have non-uniform radial lengths extending into the detonation channel.

The rotating detonation combustion system of one or more of the preceding clauses wherein the plurality of protrusions of the first mixing element and the plurality of protrusions of the second mixing element include substantially the same shape, spacing between protrusions, or radial lengths.

The rotating detonation combustion system of one or more of the preceding clauses wherein the plurality of protrusions the of the first mixing element and the plurality of protrusions of the second mixing element include at least one different shape, spacing between protrusions, or radial lengths.

The rotating detonation combustion system of one or more of the preceding clauses wherein the plurality of protrusions of the first mixing element are disposed upstream of the plurality of protrusions of the second mixing element.

The rotating detonation combustion system of one or more of the preceding clauses wherein the plurality of protrusions of the first mixing element are disposed downstream of the plurality of protrusions of the second mixing element.

The rotating detonation combustion system of one or more of the preceding clauses wherein the plurality of protrusions of the first mixing element are angled relative to the plurality of protrusions of the second mixing element.

A rotating detonation combustion system comprising: a detonation channel including an inner wall and an outer wall and extending in a longitudinal direction from an inlet of the detonation channel to an outlet of the detonation channel, the inlet provides a conduit through which fluid flows into the detonation channel; a fluid plenum fluidly connected to the inlet of the detonation channel for injecting fluid into the detonation channel; a fuel plenum fluidly connected to the inlet of the detonation channel for injecting fuel into the detonation channel; and a mixing element downstream of the fluid plenum and the fuel plenum, the mixing element forming a ring on the inner wall and/or the outer wall of the detonation channel adjacent the inlet, wherein first mixing element comprises a plurality of protrusions disposed circumferentially along the inner wall and/or the outer wall and extend into the detonation channel such that the plurality of protrusions affects vectors of at least a portion of the fuel and at least a portion of the fluid passing through recesses between the plurality of protrusions, wherein pairs of the plurality of protrusions include a connecting point therebetween one another and include spaces between each pair of the plurality of protrusions.

The rotating detonation combustion system of the preceding clauses wherein the plurality of protrusions include a substantially triangular cross-section.

The rotating detonation combustion system of one or more of the preceding clauses wherein each protrusion of the pair of the plurality of protrusions are disposed at an angle relative to the other.

The rotating detonation combustion system of one or more of the preceding clauses wherein the angle is approximately 90 degrees.

The rotating detonation combustion system of one or more of the preceding clauses wherein an outer edge of each of the plurality of protrusions extend substantially parallel to an outer edge of an adjacent pair of protrusions.

What is claimed is:

1. A rotating detonation combustion system comprising:
    a detonation channel including an inner wall and an outer wall, wherein the detonation channel includes an inlet and a combustion region downstream from the inlet, and the detonation channel extends in a longitudinal direction from the inlet of the detonation channel to the combustion region, and to an outlet of the detonation channel, wherein the inlet provides a conduit through which fluid flows into the combustion region;
    a fluid plenum fluidly connected to the inlet of the detonation channel for injecting fluid into the combustion region;
    a fuel plenum fluidly connected to the inlet of the detonation channel for injecting fuel into the combustion region; and
    a first mixing element and a second mixing element downstream of the fluid plenum and the fuel plenum and disposed between the inlet and the combustion region, the first mixing element forming a ring on the inner wall and the second mixing element forming a ring on the outer wall of the detonation channel adjacent the inlet, wherein each of the first mixing element and the second mixing element comprise a plurality of protrusions disposed circumferentially along the inner wall and the outer wall and extend into a flowpath upstream from the combustion region, wherein the plurality of protrusions are shaped to affect vectors of at least a portion of the fuel and at least a portion of the fluid passing through recesses between the plurality of protrusions.

2. The rotating detonation combustion system of claim 1, wherein at least one of the plurality of protrusions has an upstream side and/or a downstream that is sloped along the longitudinal direction.

3. The rotating detonation combustion system of claim 1, wherein at least one of the plurality of protrusions has an upstream side and/or a downstream side including a rectangular longitudinal cross-section.

4. The rotating detonation combustion system of claim 1, wherein at least one of the plurality of protrusions has an upstream side and/or a downstream side including a triangular longitudinal cross-section.

5. The rotating detonation combustion system of claim 1, wherein at least one of the plurality of protrusions has an upstream side and/or a downstream side including a trapezoidal longitudinal cross-section.

6. The rotating detonation combustion system of claim 1, wherein at least two of the plurality of protrusions of at least one of the first mixing element or the second mixing element are disposed contiguous to one another.

7. The rotating detonation combustion system of claim 1, wherein the plurality of protrusions are disposed with a uniform spacing between the plurality of protrusions.

8. The rotating detonation combustion system of claim 1, wherein the plurality of protrusions are disposed with variable spacing between the plurality of protrusions.

9. The rotating detonation combustion system of claim 1, wherein the plurality of protrusions of the first mixing element and the second mixing element have uniform radial lengths extending into the detonation channel.

10. The rotating detonation combustion system of claim 1, wherein the plurality of protrusions of the first mixing element and the second mixing element have non-uniform radial lengths extending into the detonation channel.

11. The rotating detonation combustion system of claim 1, wherein the plurality of protrusions of the first mixing element and the plurality of protrusions of the second mixing element include the same shape, spacing between protrusions, or radial lengths.

12. The rotating detonation combustion system of claim 1, wherein the plurality of protrusions of the first mixing element and the plurality of protrusions of the second mixing element include at least one different shape, spacing between protrusions, or radial lengths.

13. The rotating detonation combustion system of claim 1, wherein the plurality of protrusions of the first mixing element are disposed upstream of the plurality of protrusions of the second mixing element along the longitudinal direction.

14. The rotating detonation combustion system of claim 1, wherein the plurality of protrusions of the first mixing element are disposed downstream of the plurality of protrusions of the second mixing element along the longitudinal direction.

15. The rotating detonation combustion system of claim 1, wherein the plurality of protrusions of the first mixing element are angled relative to the plurality of protrusions of the second mixing element.

16. A rotating detonation combustion system comprising:
    a detonation channel including an inner wall and an outer wall, wherein the detonation channel includes an inlet and a combustion region downstream from the inlet, and the detonation channel extends in a longitudinal direction from the inlet of the detonation channel to the combustion region, and to an outlet of the detonation channel, wherein the inlet provides a conduit through which fluid flows into the combustion region;
    a fluid plenum fluidly connected to the inlet of the detonation channel for injecting fluid into the combustion region;
    a fuel plenum fluidly connected to the inlet of the detonation channel for injecting fuel into the combustion region; and
    a mixing element downstream of the fluid plenum and the fuel plenum and disposed between the inlet and the combustion region, the mixing element forming a ring on the inner wall and/or the outer wall of the detonation channel adjacent the inlet, wherein the mixing element comprises a plurality of protrusions disposed circumferentially along the inner wall and/or the outer wall and extend into a flowpath upstream from the combustion region, wherein the plurality of protrusions are shaped to affect vectors of at least a portion of the fuel and at least a portion of the fluid passing through recesses between the plurality of protrusions, wherein pairs of the plurality of protrusions include a connecting point therebetween one another and include spaces between each pair of the plurality of protrusions.

17. The rotating detonation combustion system of claim 16, wherein the plurality of protrusions include a substantially triangular cross-section.

18. The rotating detonation combustion system of claim 16, wherein each protrusion of the pairs of the plurality of protrusions are disposed at an angle relative to the other.

19. The rotating detonation combustion system of claim 18, wherein the angle is approximately 90 degrees.

20. The rotating detonation combustion system of claim 16, wherein an outer edge of each of the plurality of protrusions extend substantially parallel to an outer edge of an adjacent pair of protrusions.

\* \* \* \* \*